3,675,989
LIQUID CRYSTAL OPTICAL CELL WITH SELECTED ENERGY SCATTERING
Roy Pietsch, Austin, Tex., and Bernard L. Lewis, Satellite Beach, Fla., assignors to Radiation Incorporated, Melbourne, Fla.
Filed Nov. 26, 1969, Ser. No. 880,129
Int. Cl. G02f 1/36
U.S. Cl. 350—160 R                     5 Claims

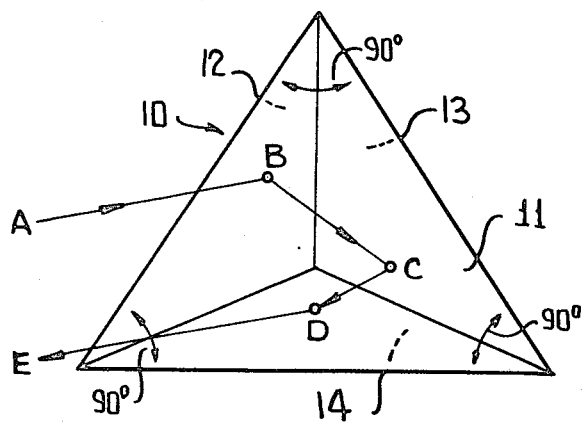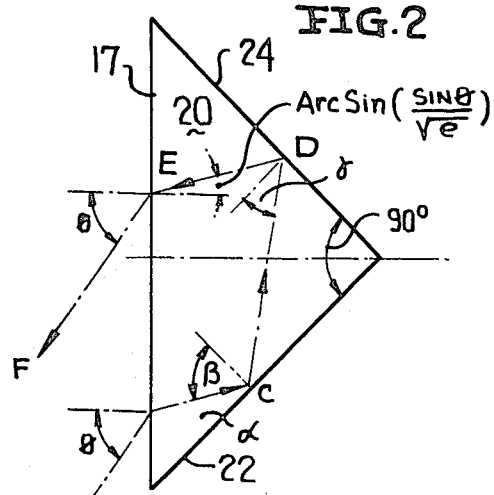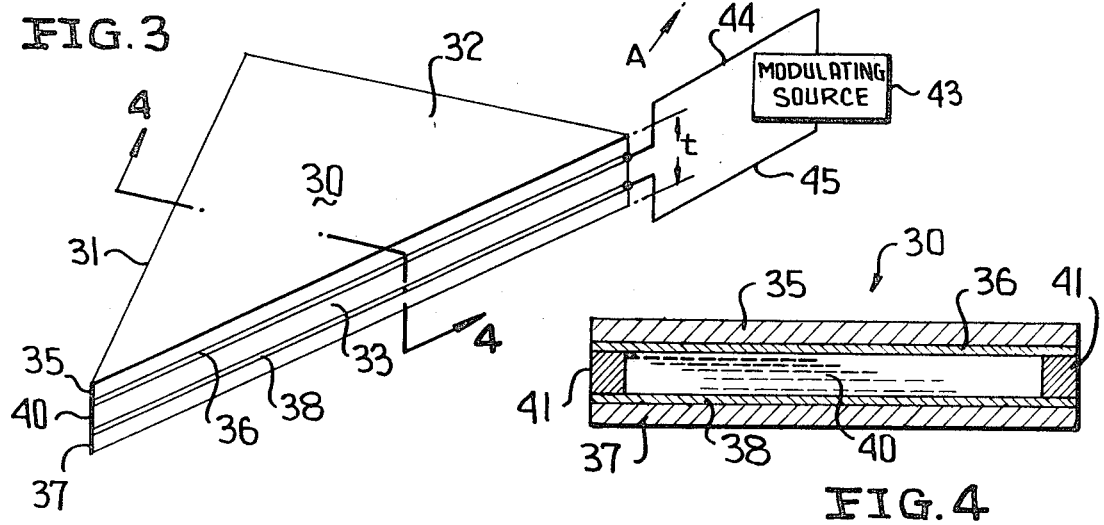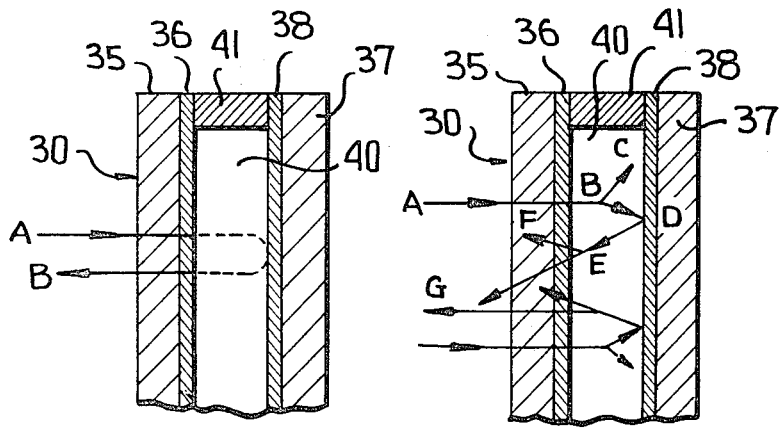

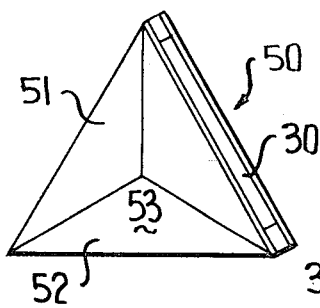
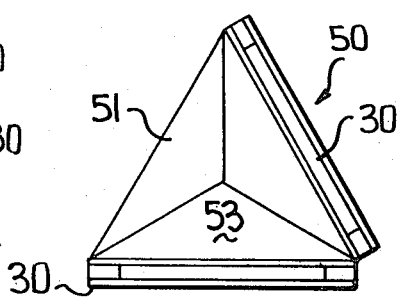
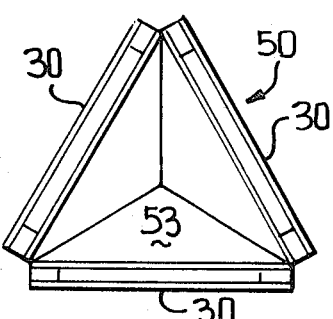
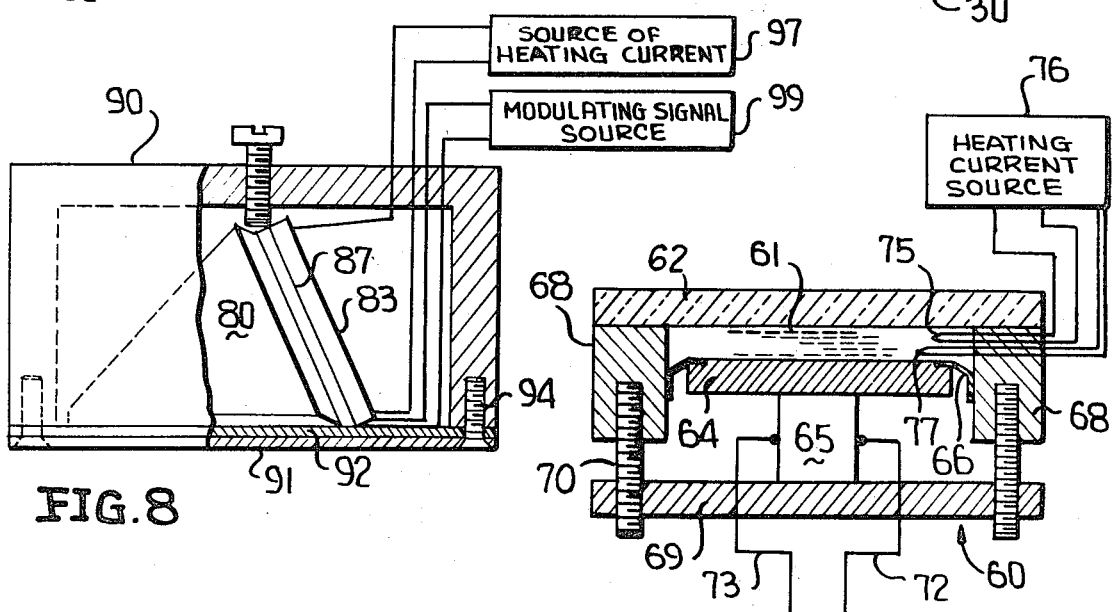
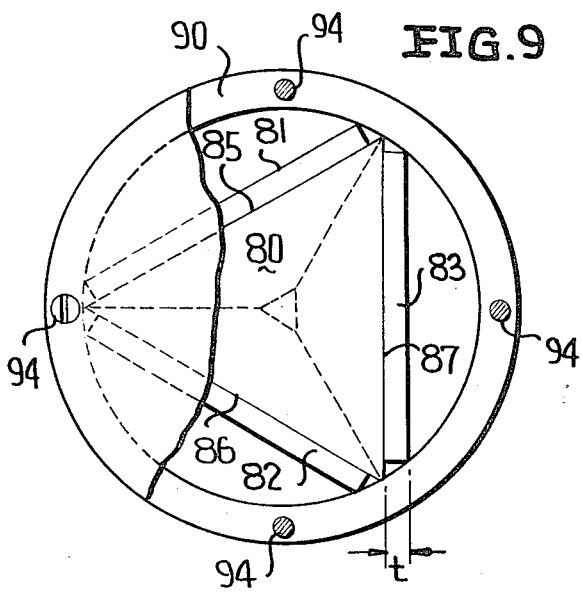

ABSTRACT OF THE DISCLOSURE

An optical cell includes a pair of spaced-apart walls, at least one of which is transparent to radiant energy in a wavelength band to be accommodated by the cell and is positioned for incidence of the radiant energy thereon. A liquid crystal medium is interposed between and in contact with the opposing surfaces of the cell walls. The crystalline planes of the liquid crystal medium are normally disposed to permit passage of coherent radiant energy through the medium to impinge on the other wall. When such passage is to be restricted, the crystalline planes are subjected to shearing to randomly scatter and thereby render incoherent the radiant energy incident on the liquid crystal medium.

BACKGROUND OF THE INVENTION

The present invention is in the field of wireless communications systems, and is directed more particularly to signalling systems wherein information is impressed on a carrier wave as it is reflected back to a remote source of the wave.

It is frequently necessary or desirable to provide systems by which information may be supplied to a central station from a remote station, where the remote station is incapable of generating the power required to actively transmit the information over the distance involved. In such instances, it has become common practice to employ at the remote station a retrodirective reflector simulating a target of large cross section, and to provide means at the remote station for modulating the information on a wave transmitted from the central station, prior to or during reflective return of the wave to the central station. The wave may then be demodulated at the latter station to obtain the information supplied by the remote station.

A popular type of retrodirective reflector for such purposes has been the corner reflector, which generally comprises a plurality of reflecting surfaces so intersecting one another that a beam or wavefront incident on the corner is succesively reflected from two or more of those surfaces in a direction back toward the source of the beam or wavefront. This is illustrated by the reflector configuration shown in FIG. 1. The corner reflector 10 has intersecting sheet metal planes (mirrors) 12, 13 and 14 defining a tetrahedral geometry with a transparent front face or opening 11. The angle between each pair of intersecting planes is 90°, as shown. A ray A representative of the direction of propagation of an electromagnetic wave or beam strikes surface 12 at point B, is reflected therefrom to strike surface 13 at point C, is again reflected to impinge on surface 14 at point D, and finally leaves the corner in the direction E back toward its source.

The aperture of the corner reflector may be widened, to accommodate beams incident over a wider angle of arrival than is possible with corners composed strictly of metal sheet or wire plane surfaces, by filling the corner with dielectric material of appropriate dielectric constant, or by using a solid dielectric polyhedron without metal surfaces. Such a configuration is shown in FIG. 2. Corner reflector 20 is composed of dielectric material having a relative dielectric constant of $\epsilon$ with respect to the medium in which the reflector is immersed (normally air, which has a dielectric constant of unity, so that $\epsilon$ is the dielectric constant of corner reflector 20). Ray A is incident on face 17 at an angle $\theta$, is refracted on entry of the dielectric to the path BC at an angle of refraction $\alpha$ with respect to the normal to face 17, where $$\alpha = \text{arc sin}\left(\frac{\sin \theta}{\sqrt{\epsilon}}\right) \quad (1)$$

The ray strikes boundary 22 at point C at an angle $\beta$ to the normal, where $\beta = 45° + \alpha$. If $\beta$ is greater than the critical angle, $\theta_{cr}$, for the boundary 22, where $$\theta_{cr} = \text{arc sin}\frac{1}{\sqrt{\epsilon}} \quad (2)$$

then the ray undergoes total internal reflection and is incident at point D of boundary 24 at an angle $\gamma = 45° - \alpha$. Again, the total reflection takes place if $\gamma > \theta_{cr}$; the ray is then incident on boundary 17 at angle $\alpha$, and if the latter angle is less than $\theta_{cr}$, the ray passes through face 17 undergoing refraction toward point F, in the direction of its source. It has been shown in the prior art that by appropriate selection of dielectric constant of the corner reflector, retrodirective action may be achieved over a solid angle of arrival much greater than 90 degrees.

Control of the reflecting coefficient at one or more of the reflecting planes or boundaries of these corner reflectors is effective to vary the intensity of the returned beam. In the past, such techniques as employment of an ionizable gaseous medium adjacent one reflecting face of a dielectric corner, or deposition of an array of voltage variable electrical components on one reflecting face of the dielectric, coupled with a suitable source of modulating voltage for varying the state of ionization of the gas or the voltage variable component of the array, have met wtih success.

The present invention provides a technique for exercising control over the reflection coefficient of one or more faces of a corner reflector, and is effective with corners of all types, including the metal type, the partially or fully dielectric-filled type, and the completely dielectric type.

SUMMARY OF THE INVENTION

Briefly, the present invention provides control of the reflection coefficient at any of the reflecting planes by use of liquid crystals in the mesomorphic state at that reflecting plane. In one embodiment of the invention, either nematic liquid crystals or a mixture of cholesteric and nematic liquid crystals existing in the mesomorphic state are contained in avariable electrical cell constituting one of the reflecting planes or boundaries of the corner reflector. Control of the electrical potential across the cell is effective to excite a dynamic scattering mode in the crystals, during which the intensity of the beam transmitted through the crystals is reduced.

In a second form of the invention, liquid cholesteric crystals in the mesomorphic state within a variable pressure cell replace a reflecting face of the corner reflector. As in the previously briefly-described embodiment, a scattering mode is induced in the crystals, but is achieved here by placing the crystalline planes in shear. The result is again a corresponding reduction in intensity of the beam reflected back to the source.

In either of these forms, the invention serves to permit modulation of the return beam to impress thereon any desired information.

BRIEF DESCRIPTION OF THE DRAWINGS

FIG. 1 and FIG. 2 are optical schematic diagrams useful in explaining the reflecting characteristics of typical corner reflectors, and described earlier;

FIGS. 3 and 4 are respectively perspective and section views of one embodiment of a liquid crystal cell for use as a reflecting plane or boundary in a corner reflector according to the present invention;

FIGS. 5(a) and (b) are section views of the cell of FIGS. 3 and 4 useful in explaining its operation;

FIGS. 6(a), (b), and (c) are simplified front views of corner reflectors incorporating the liquid cell structure;

FIG. 7 is a section view taken along a plane containing the axis of symmetry of a liquid crystal cell constituting another embodiment of the invention; and FIGS. 8 and 9 are respectively side and front views of a more detailed corner reflector structure incorporating liquid crystal cells in accordance with the invention;

DETAILED DESCRIPTION OF THE PREFERRED EMBODIMENTS

Referring now to FIGS. 3 and 4, an electrical cell 30 which may be generally of triangular shape, or of other suitable geometric configuration depending upon the shape of the reflecting plane in the corner reflector with which it is to be used, is composed of several layers of materials. The dimensions of the cell are not particularly critical, but it will be observed that for use with a prismatic corner of tetrahedral shape, for example, the surface or opening which will face the incoming beams may constitute an equilateral triangle with sides of length $l$. In such a case, the three remaining surfaces (i.e., the reflecting planes) are identically shaped right triangles, each having the dimensions $l/\sqrt{2}$, $l/\sqrt{2}$, and $l$, as is shown in the cell of FIG. 3 for the edges 31, 32 and 33, respectively. The thickness $t$ (FIG. 3) of the cell is also non-critical, a typical range of dimensions being from 0.02 inch to 0.25 inch for electromagnetic energy having a wavelength in the range from 0.5 to 10.0 centimeters. While reference may at times be made in this specification to "beams" and to "optical" corner reflectors, it is to be emphasized that the principles presented herein apply to energy throughout the electromagnetic spectrum.

Generally speaking, cell 30 need only be composed of three layers, namely a conducting layer transparent to energy at the wavelengths of interest, a further conducting layer spaced from the first conducting layer and preferably constituting a totally reflecting surface, and a layer of liquid crystals interposed between the two conducting layers and in direct contact therewith. The transparent conducting layer is positioned to be encountered first by an incoming beam incident on the cell, and the reflective conducting layer is positioned to receive the beam after passage through the liquid crystals.

In the specific embodiment of FIG. 3, for use in reflecting visible coherent light beams, the transparent conducting layer includes a thin glass plate 35 on which a transparent conducting film 36, such as tin oxide, has been deposited. The reflective conducting layer may include any rigid substrate 37 to which a thin reflecting, electrically conducting film 38, such as silver, will adhere in smooth, continuous, flat contour. Liquid crystals maintained in the mesomorphic state constitute the layer 40 between and contacting conductive films 36 and 38. A spacer or gasket 41 (FIG. 4) composed of electrically insulating, liquid-impervious material is cemented in position at the exterior edges of the cell to retain the liquid crystals therein. Typically, spacer 41 has a thickness in the range from 0.5 mil to 2 mils, this constituting the thickness of the liquid crystal layer 40, for example. The liquid crystals may be completely organic nematic; or may be a mixture of liquid nematic crystals and liquid cholesteric crystals in a volumetric ratio of approximately 9:1, respectively. A typical nematic compound for use in the invention is anisylidene p-aminophenylacetate. A typical cholesteric compound for use in the invention is cholesteryl nonanoate. It is essential that both electrical conducting surfaces 36 and 38 be in contact with the liquid crystals.

With a one mil spacer 41 between conducting surfaces 36 and 36, a potential difference in the range, for example, from 10 to 130 volts, across the cell is sufficient to produce the dynamic scattering mode in the crystalline layer 40, the specific voltages depending on the specific composition of layer 40. The operating potential may be applied to the cell by a modulating signal source 43 connected to the conducting films via leads 44 and 45 (FIG. 3).

Referring now to FIG. 5a, when the liquid crystals 40 are not in the scattering mode, a light beam represented by ray A is incident on the cell 30, passes through glass plate 35 and transparent conducting film 36, then through liquid crystals 40 and is reflected by surface 38. The reflected ray passes back through the liquid crystalline layer, transparent conducting surface, and glass plate, and out of the cell in a direction B (the direction of arrival and direction of reflection being other than merely opposite, since generally two or three reflecting planes will be encountered between incidence of the beam on the corner reflector and reflection therefrom). Thus, the beam is eventually returned toward its source with virtually no loss in intensity.

With reference to FIG. 5b, the existence of a sufficient potential difference between films 36 and 38 to excite the dynamic scattering mode in the liquid crystals has the effect that the incident beam is diffused as it passes and returns through the liquid crystalline layer. For example, ray A (FIG. 5b) passes through cell layers 35 and 36 and partially through the crystals before diffusion at point B along separate paths BC and BD. At point D on surface 38 a portion of the beam is reflected to point E with additional diffusion, and diffused portions leave the cell along paths EF and EG. Thus, the intensity of the original beam is substantially reduced during passage through the cell when the crystals 40 are in the scattering mode.

As shown in FIGS. 6a, b, and c, respectively, a retrodirective corner reflector 50 of tetrahedral configuration may have reflecting planes 51 and 52, and a cell 30, as described above, constituting the plane intersecting planes 51 and 52 to form the corner; or merely one conventional reflecting face 51, with two cells forming the other intersecting reflecting planes; or may have cells 30 constituting all three reflecting planes. Moreover, the open region between the reflecting planes may be partially or completely filled with dielectric material 53 of different dielectric constant from the surrounding medium. Alternatively, the corner reflector may be basically formed as a solid dielectric, with one or more of its reflecting planes (i.e., boundaries at which total internal reflection can occur) covered with a cell 30.

Referring now to FIG. 7, a second form of the invention resides in a variable pressure cell 60, also containing liquid crystals in a layer 61. A transparent plate 62 is disposed relative to the incoming beam to be the first portion of cell 60 encountered by the beam and, in the specific example of a coherent light beam, may be composed of glass. Spaced from plate 62 and defining the region within which liquid crystals 61 are confined, is a mirror 64 which is fastened to one side of a piezoelectric crystal 65. A thin, flexible, liquid-impermeable ring 66 (e.g., of rubber) is cemented along one edge to mirror 65 and along the opposite edge to a tube 68 (which need not be cylindrical), to ensure retention of liquid crystals 61 in the space between plate 62 and mirror 64.

The side of piezoelectric crystal 65 opposite that to which mirror 64 is fastened, is itself attached to a mounting bar 69 having several screws 70 passing therethrough and threaded into tube 68 to permit varying the gap between plate 62 and mirror 64 by screwing the bar toward tube 68. The spacing between plate or window 62 and the opposing surface of mirror 64 is typically in the range from one micron ($\mu$) to $25\mu$, and is obviously greatly exaggerated in FIG. 7, for the sake of clarity. When mounting bar 69 is moved toward tube 68, it reduces this gap and controls the pressure exerted by mirror 64 on the liquid crystals.

By selectively applying a voltage to piezoelectric crystal 65, the latter undergoes movement to rotate or displace mirror 64 relative to window 62, and thereby to shear the crystalline planes of liquid crystals 61. Shearing of the crystalline planes in turn causes diffusion of beam energy upon passage therethrough. By varying the frequency as well as the application of the voltage, a beam incident on cell 60 may be modulated in intensity and desired information may thus be impressed on the beam of energy prior to return toward its source. Modulating signal source 71 is suitable for this purpose, being attached to crystal 65 via electrical leads 72, 73.

In this embodiment, the liquid crystals are preferably cholesteric, and as in the previous embodiment, maintained in their mesomorphic state. Cholesteric compounds suitable for use as liquid crystals 61 in the embodiment of FIG. 7, include the compound mentioned earlier, and compounds available from Distillation Products Industries (DPI), Division of Eastman Kodak Co. as Eastman Cholesteric Mixtures 18–21–10, 21–23–10, and 34–35–10.

As in the previously described embodiment, variable pressure cell 60 may be used as any one or more of the reflecting planes or boundaries of the retrodirective corner reflector. The variable pressure referred to is that exerted by the mirror as it undergoes slight rotational movement to produce shearing stresses on the liquid crystalline planes in response to excitation of piezoelectric crystal 65; not the pressure control or coarse adjustment effected by movement of mounting bar 69 toward tube 68, since the bar is moved to a fixed position and is not normally varied in position during the actual use of the corner reflector. However, the driving of mirror 64 to exert shearing forces need not be provided by electrical excitation of a piezoelectric crystal, although such an arrangement does have the advantage of rapid response to electrical signals to be impressed on the beam incident on the corner reflector.

In order to maintain the liquid crystals in liquid form and mesomorphic state, it is necessary that their environmental temperautre be controlled. The cholesteric compounds, for example, must be maintained at their cholesteric temperatures, which depend specifically on the organic cholesterals being used, as is known in the art relating to liquid crystals. In the particular example of cholesteryl nonanoate given earlier, the required temperature range is from approximately 78° C. to about 91° C. Where a mixture of nematic and cholesteric compounds is used in the cell, an appropriate temperature must be found to maintain the mesomorphic range, and this will typically be less than 100° C. Quite clearly, the other materials used in construction of the cell must be able to withstand such temperature, but this constitutes no significant problem since the temperatures involved are not sufficiently great to cause deterioration of any typical materials for use in the cell.

To maintain the desired temperature during use of the cell embodiments of FIGS. 1 through 5, a direct current of relatively low magnitude may be passed through one or both conductive coatings. The IR losses caused by such current flow are dissipated as heat, which is applied to the material on which the conducting film is coated and also to the liquid crystal compound. The latter, being in direct contact with the film, is therefore directly heated to the necessary temperature. To maintain the latter temperature during corner reflector use, a temperature sensing device such as a thermocouple is placed in the liquid to measure the temperature thereof, and, by feedback current, to control the heater current. In the embodiment of FIG. 7, a heater 75 connected to a heater current source 76 by leads passing through liquid-sealed holes in tube 68, is placed directly in contact with the liquid crystal compound. In practice the heater filament may be attached to the interior surface of tube 75 to prevent obstruction of incoming radiant energy. A thermocouple 77, positioned in the liquid, senses the temperature thereof and supplies a control current back to heater source 76 to maintain the temperature at the desired value.

A typical corner reflector structure incorporating a cell for each reflecting plane is shown in FIGS. 8 and 9. Referring to those figures, a dielectric prism 80, transparent to radiant energy at the wavelengths of the beams to be reflected (e.g., composed of glass for visible light), and having the shape of a tetrahedron, has liquid crystal cells 81, 82 and 83, of identical geometry and characteristics, cemented to the three intersecting sides or surfaces 85, 86 and 87, respectively, forming the corner from which the incoming radiant energy is to be reflected. The liquid crystal cells may be of either type described above, i.e., to vary the reflection coefficient of the cell by selective excitation of the liquid crystals to the dynamic scattering mode by application of modulating signal voltage to the cell electrodes (conducting films), or by exerting shearing forces on the liquid crystalline planes by appropriate pressure variations.

The prism 80, with liquid crystal cells attached, is secured in a cup-shaped housing 90 which may be transparent or opaque. A cover in the form of one or more optical windows (i.e., transparent to wavelengths of radiant energy in the range of interest) 91, 92, is fastened to the rim of housing 90 by appropriate fasteners, such as bolts or screws 94. An adjustable clamp 95 abutting against a small "flat" (i.e., flat surface parallel to entrance plane or face 96 of the prism), and threaded through housing 90, ensures that the corner reflector is secured in the housing.

Leads attached to one or both conductive coatings to permit pasage of heating current therethrough are connected to a source of heater current 97 outside housing 90, and additional leads are attached to appropriate cell electrodes from a source of modulating signal 99. While a single heater source will suffice for all three cells, a separate modulating signal source may be used in conjunction with each respective reflection coefficient-varying cell.

We claim:

1. Apparatus for scattering coherent light, comprising an optical cell,
light source means for directing coherent light in a wavefront onto said optical cell, said optical cell including
a pair of rigid, normally parallel, relatively movable plates having a narrow gap therebetween,
a layer of liquid crystals confined in the gap between said plates and in continuous contact with the opposed surfaces of said plates defining said gap, said liquid crystal layer normally having crystalline planes in an ordered arrangement to permit substantially undisturbed passage of coherent light therethrough,
one of said plates being transparent and positioned to receive said wavefront of coherent light for passage thereof into said liquid crystal layer, and electromechanical transducer means coupled to the other of said plates and operative, when electrically energized, to vary the spacing between said plates by an amount sufficient to produce shearing of said crystalline planes and thereby to cause random scattering of the coherent light incident on said liquid crystal layer.

2. Apparatus according to claim 1, wherein said electromechanical transducer means comprises piezoelectric crystal means fastened to said other plate, and electrodes coupled to said piezoelectric crystal means for selectively applying an electrical voltage thereto to produce a related mechanical motion by which the spacing between said plates is varied.

3. Apparatus according to claim 1, wherein said other plate has a light-reflecting surface in contact with said liquid crystal layer.

4. Apparatus according to claim 1, wherein said gap between said plates is in the range of one micron to twenty five microns.

5. Apparatus according to claim 1, further including heat transfer means coupled to said liquid crystal layer for maintaining the temperature thereof substantially constant at a preselected level.

References Cited

UNITED STATES PATENTS

| | | | |
|---|---|---|---|
| 3,322,485 | 5/1967 | Williams | 350—160 |
| 3,417,398 | 12/1968 | Lewis et al. | 350—160 |
| 3,499,112 | 3/1970 | Heilmeier et al. | 350—160 |
| 3,257,903 | 6/1966 | Marks | 350—267 |
| 3,473,031 | 10/1969 | White | 250—199 |
| 3,441,513 | 4/1969 | Woodmansee | 350—160 |

OTHER REFERENCES

Liquid Crystals; J. L. Fergason; Scientific American; vol. 21, August 1964, pp. 77–82 and 85.

Liquid Crystals; Product Engineering; Dec. 21, 1964, vol. 35, pp. 5, 6 and 57.

RONALD L. WIBERT, Primary Examiner

V. P. McGRAW, Assistant Examiner

U.S. Cl. X.R.

250—199